United States Patent
Wang et al.

(10) Patent No.: US 11,926,707 B2
(45) Date of Patent: Mar. 12, 2024

(54) PREPARATION METHOD OF ZEOLITE/POLYIMIDE COMPOSITE MEMBRANE AND APPLICATIONS THEREOF

(71) Applicant: Wuhan University of Technology, Wuhan (CN)

(72) Inventors: Xiang Wang, Wuhan (CN); Danxia Chen, Wuhan (CN); Yanling Li, Wuhan (CN); Jun Wang, Wuhan (CN); Xiaoli Yang, Wuhan (CN); Huajun Duan, Wuhan (CN)

(73) Assignee: WUHAN UNIVERSITY OF TECHNOLOGY, Wuhan (CN)

( * ) Notice: Subject to any disclaimer, the term of this patent is extended or adjusted under 35 U.S.C. 154(b) by 645 days.

(21) Appl. No.: 17/105,545

(22) Filed: Nov. 26, 2020

(65) Prior Publication Data
US 2021/0155756 A1    May 27, 2021

(30) Foreign Application Priority Data
Nov. 26, 2019   (CN) .......................... 201911170360.5

(51) Int. Cl.
| | | |
|---|---|---|
| *C08G 73/10* | (2006.01) | |
| *B01D 67/00* | (2006.01) | |
| *B01D 71/02* | (2006.01) | |
| *B01D 71/64* | (2006.01) | |
| *C08G 85/00* | (2006.01) | |
| *C08K 3/34* | (2006.01) | |
| *H01M 10/0525* | (2010.01) | |
| *H01M 50/403* | (2021.01) | |
| *H01M 50/446* | (2021.01) | |

(52) U.S. Cl.
CPC ...... *C08G 73/1082* (2013.01); *B01D 67/0011* (2013.01); *B01D 71/028* (2013.01); *B01D 71/64* (2013.01); *C08G 73/1085* (2013.01); *C08G 85/004* (2013.01); *C08K 3/34* (2013.01); *H01M 10/0525* (2013.01); *H01M 50/403* (2021.01); *H01M 50/446* (2021.01); *B01D 2325/02* (2013.01)

(58) Field of Classification Search
CPC ............. H01M 50/446; C08G 73/1082; C08G 73/1085; C08J 2379/08
See application file for complete search history.

(56) References Cited

U.S. PATENT DOCUMENTS

2016/0254511 A1* 9/2016 Hatta ...................... B60L 50/64
307/10.1

FOREIGN PATENT DOCUMENTS

| CN | 102057518 A | * | 5/2011 | .......... H01M 10/052 |
| JP | 06287327 A | * | 10/1994 | |
| JP | 2017212201 A | * | 11/2017 | |

OTHER PUBLICATIONS

Machine translation of JP 2017212201 (2017, 19 pages).*
Machine translation of JP 06287327 (1994, 5 pages).*
Machine translation of CN 102057518 (2011, 18pages).*

* cited by examiner

*Primary Examiner* — Brieann R Johnston
(74) *Attorney, Agent, or Firm* — MATTHIAS SCHOLL P.C.; Matthias Scholl

(57) ABSTRACT

A preparation method of a zeolite/polyimide composite membrane includes: synthesizing a zeolite-doped polyamic acid precursor casting solution by condensation polymerization synthesis; coating a substrate with the obtained casting solution, and obtaining a zeolite/polyamic acid composite porous membrane by non-solvent induced phase separation; and obtaining the zeolite/polyimide composite membrane by performing thermal imidization on the zeolite/polyamic acid composite porous membrane through gradient heating.

8 Claims, 3 Drawing Sheets

PREPARATION METHOD OF ZEOLITE/POLYIMIDE COMPOSITE MEMBRANE AND APPLICATIONS THEREOF

CROSS-REFERENCE TO RELATED APPLICATIONS

Pursuant to 35 U.S.C. § 119 and the Paris Convention Treaty, this application claims foreign priority to Chinese Patent Application No. 201911170360.5 filed on Nov. 26, 2019, the contents of which, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18th Floor, Cambridge, MA 02142.

BACKGROUND

The disclosure relates to a preparation method of a zeolite/polyimide composite membrane and an application thereof.

At present, most commercial separators are polyolefin separators manufactured by dry or wet processes, such as PE single-layer membranes, PP single-layer membranes, and PP/PE/PP three-layer composite membranes. The polyolefin separator is low in production cost and has excellent electrochemical stability, good mechanical strength and good acid and alkali resistance, so it has always become the first choice for separator products. However, the current polyolefin separator also has some shortcomings. The polyolefin separator electrolyte has insufficient wetting ability and poor heat resistance, and thus, it is difficult to meet the requirements of the power lithium ion batteries for the separators.

In recent years, the application of polyimide in the lithium ion battery separators has also attracted more and more attention. Due to its five-element hybrid structure, polyimide can be used for a long time in a high temperature environment of 300° C. Thus, the safety of the lithium ion batteries can be effectively improved. In addition, in order to further improve the electrolyte wettability of the battery separator, researchers usually adopt a method of adding a certain amount of inorganic nano-particles which usually include $SiO_2$, $Al_2O_3$, $TiO_2$ and the like. Zeolite has a unique channel structure, a high surface area and a strong Lewis acidity, making it one of candidate inorganic nano-materials for fillers of the lithium ion battery separators.

At present, the preparation method of a polyimide membrane mainly includes electrospinning, but less research is carried out on a non-solvent induced phase separation.

SUMMARY

In one aspect, the disclosure provides a preparation method of a zeolite/polyimide composite membrane. The prepared zeolite/polyimide composite membrane combines a high temperature resistance of polyimide and an electrolyte-philic performance of zeolite, and can effectively improve safety and electrochemical performance of a corresponding lithium ion battery.

In another aspect, the disclosure provides an application of the zeolite/polyimide composite membrane.

A preparation method of a zeolite/polyimide composite membrane comprises synthesizing a zeolite-doped polyamic acid precursor casting solution by condensation polymerization synthesis; coating a substrate with the obtained casting solution, and obtaining a zeolite/polyamic acid composite porous membrane by non-solvent induced phase separation; and obtaining a zeolite/polyimide composite membrane by performing thermal imidization on the zeolite/polyamic acid composite porous membrane through gradient heating.

Specifically, the method comprises:
1) adding zeolite to an organic solvent, and dispersing zeolite uniformly to obtain a zeolite dispersion; adding a diamine monomer and a dianhydride monomer to the zeolite dispersion at a certain temperature, and obtaining the zeolite-doped polyamic acid precursor casting solution by the condensation polymerization reaction;
2) applying the casting solution obtained in 1) on a surface of the substrate to form a liquid membrane; placing the liquid membrane in an environment with a humidity of 70%-90% such that the liquid membrane is subjected to preliminary phase separation, and placing the liquid membrane in a coagulation bath such that the liquid membrane is completely phase-separated to obtain a microporous membrane, thereby obtaining the zeolite/polyamic acid composite porous membrane; and
3) performing thermal imidization on the zeolite/polyamic acid composite porous membrane obtained in 2) by gradient heating so as to obtain the zeolite/polyimide composite membrane.

According to the preparation method of the disclosure, the zeolite/polyimide composite membrane is prepared using the non-solvent induced phase separation. Different from the traditional non-solvent induced phase separation, in the disclosure, the liquid membrane is firstly subjected to a slow phase separation process in a high-humidity environment and then completely phase-separated in a coagulation bath, so as to obtain the zeolite/polyimide composite membrane with small pore size and uniform pore size distribution. The zeolite/polyimide composite membrane prepared by the method of the disclosure has a thickness of 27-34 μm and a pore size of 2-4 μm, and has uniform pore size distribution.

In a class of this embodiment, in 1), a mass percentage of the zeolite in the zeolite dispersion is 1%-5%; and the zeolite is at least one of MCM-41, NaY, NaA and ZSM-5.

In a class of this embodiment, in 1), the diamine monomer and the dianhydride monomer are added to the zeolite dispersion at 0-15° C. for performing condensation polymerization reaction; and a molar ratio of the diamine monomer to the dianhydride monomer is 1:1.01-1.02.

In a class of this embodiment, in 1), the diamine monomer is at least one of 4,4'-diaminodiphenyl ether, 2,2-bis(4-(4-aminophenoxy)phenyl)propane, 4,4'-diaminodiphenyl sulfone, 4,4'-diaminodiphenylmethane and m-phenylenediamine; and the dianhydride monomer is at least one of pyromellitic dianhydride, 3,3',4,4'-diphenyl ether tetracarboxylic dianhydride, 3,3',4,4'-benzophenonetetracarboxylic dianhydride, 3,3',4,4'-biphenyl tetracarboxylic dianhydride and 4,4'-(hexafluoroisopropylidene)phthalic anhydride.

In a class of this embodiment, in 1), the organic solvent is at least one of N'N-dimethylformamide, N'N-dimethylacetamide, N-methylpyrrolidone and dimethylsulfoxide.

In a class of this embodiment, in 1), in the zeolite-doped polyamic acid precursor casting solution, a mass ratio of the zeolite to the polyamic acid is 5:100-15:100, and a total mass percentage of the zeolite and the polyamic acid is 10%-20%.

In a class of this embodiment, in 2), an operating temperature is 20° C.-30° C., the coagulation bath is capable of dissolving the solvent in the polyamic acid but not the polyamic acid, and the coagulation bath is water or/and ethanol.

In a class of this embodiment, in 3), the specific process of the thermal imidization by gradient heating is: the zeolite/polyamic acid composite porous membrane is firstly held at 100-140° C. to remove the residual solvent and moisture; and the zeolite/polyamic acid composite porous membrane is then held at 200-240° C. for 0.5-1 h, and finally held at 280-320° C. for 0.5-1 h to realize imidization of the zeolite/polyamic acid composite porous membrane, thereby obtaining the zeolite/polyimide composite membrane.

The disclosure also provides an application of the zeolite/polyimide composite membrane prepared by the preparation method in a lithium ion battery as a separator.

The following advantages are associated with the method of a zeolite/polyimide composite membrane of the disclosure:

(1) The method prepares the zeolite/polyimide composite membrane using the non-solvent induced phase separation and the zeolite in the composite membrane has a unique channel structure and a high surface area. When the composite membrane is used as a separator of a lithium ion battery and the channels of the zeolite absorb a sufficient amount of electrolyte, a special transmission passage can be formed in the membrane. In this case, lithium ions can diffuse not only in the pores outside the zeolite particles, but also in the channel structure of the zeolite itself, which effectively improves electrolyte wettability and a liquid absorption rate of the separator. In addition, the zeolite can also perform Lewis acid-base reaction with the electrolyte, thereby improving electrochemical performances such as ionic conductivity and the like.

(2) The zeolite/polyimide composite membrane prepared by the method of the disclosure has a three-dimensional sponge-like structure, so that it has good inter-pore connectivity, high porosity and uniform pore size distribution. When used as the separator of the lithium ion battery, the zeolite/polyimide composite membrane helps to improve the ionic conductivity of the separator, thereby improving the corresponding battery charge/discharge performance.

DETAILED DESCRIPTION

To further illustrate, embodiments detailing a preparation method of a zeolite/polyimide composite membrane and an application thereof are described below. It should be noted that the following embodiments are intended to describe and not to limit the disclosure.

Example 1

A preparation method of a zeolite/polyimide composite membrane comprises the following steps:

(1) 0.13 g of ZSM-5 zeolite and 19 g of N'N-dimethylacetamide were weighed and blended at room temperature, and ultrasonicated for 3 h to obtain a zeolite dispersion. 2 mmol of 4,4'-diaminodiphenyl ether and 2 mmol of 2,2-bis(4-(4-aminophenoxy)phenyl)propane were added to the prepared zeolite dispersion at room temperature, and the mixture was mechanically stirred under nitrogen protection to a complete dissolution. Then, 4.08 mmol of 3,3',4,4'-diphenyl ether tetracarboxylic dianhydride was added, and the mixture was mechanically stirred under nitrogen protection to react at 10-15° C. for 10 h, thereby obtaining a yellow viscous zeolite-doped polyamic acid precursor casting solution, where a mass ratio of the zeolite to the polyamic acid was 5:100.

(2) After the mixture was defoamed by standing, the above casting solution was blade-coated on a clean glass plate to obtain a liquid membrane with a thickness of 150 μm. Then the liquid membrane was placed in an environment with a room temperature of 20° C. and a humidity of 70%, subjected to preliminary phase separation for 20 min, and then immediately immersed in an ethanol coagulation bath for 10 min, such that the liquid membrane was completely phase-separated, thereby obtaining a microporous membrane. Then, the microporous membrane was soaked in de-ionized water for 12 h to remove the residual solvent, thereby obtaining an un-imidized zeolite/polyamic acid porous membrane.

(3) The obtained zeolite/polyamic acid porous membrane was dried at 100° C. for 2 h to remove the residual solvent and moisture in the membrane, and then heated at 200° C. for 1 h and at 280° C. for 1 h so as to realize imidization of the membrane by heating, thereby obtaining a completely-imidized zeolite/polyimide composite membrane.

Figure 1:
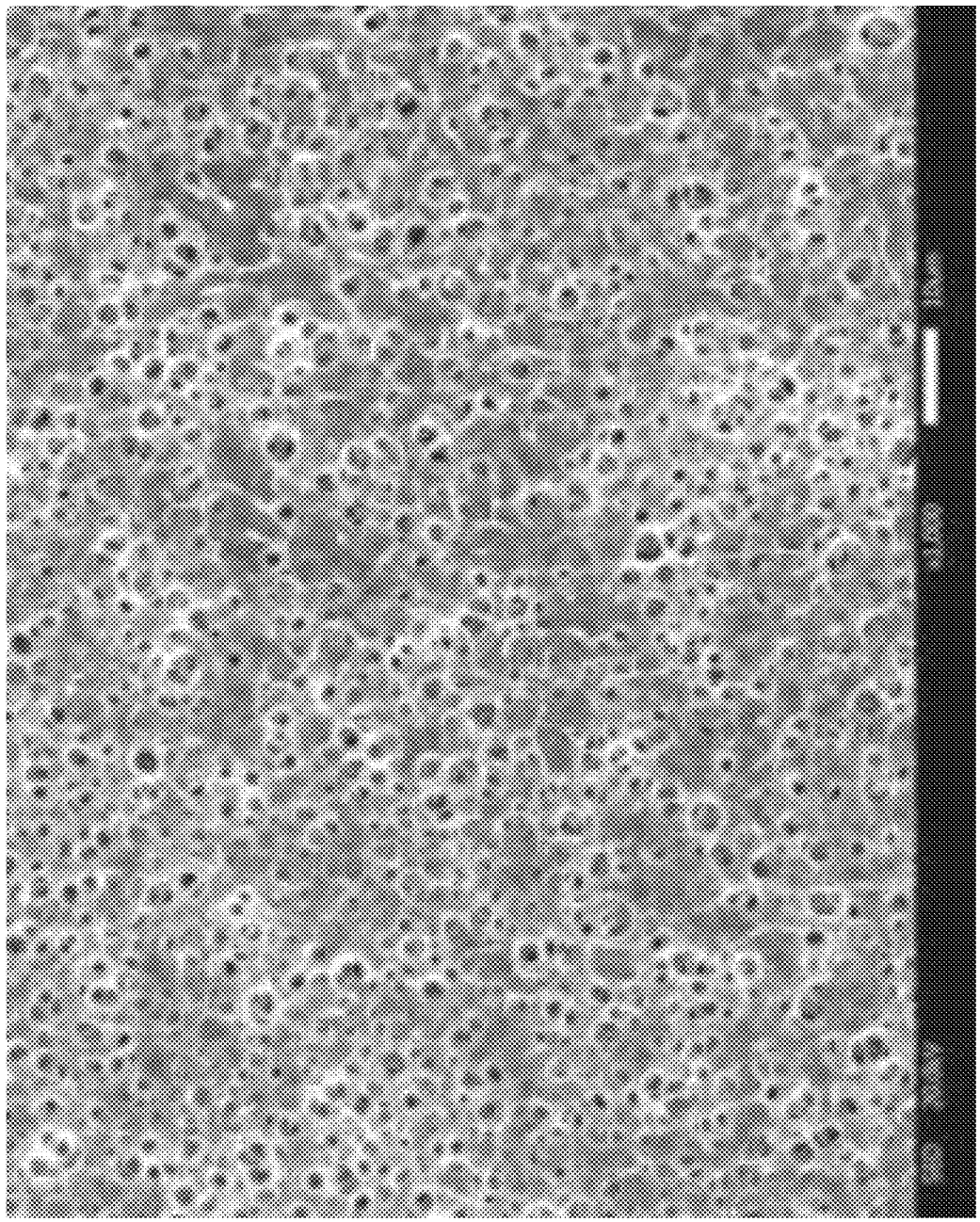
FIG. 1 is a scanning electron micrograph of a surface of a zeolite/polyimide composite membrane obtained in Example 1 of the disclosure.
Figure 2:
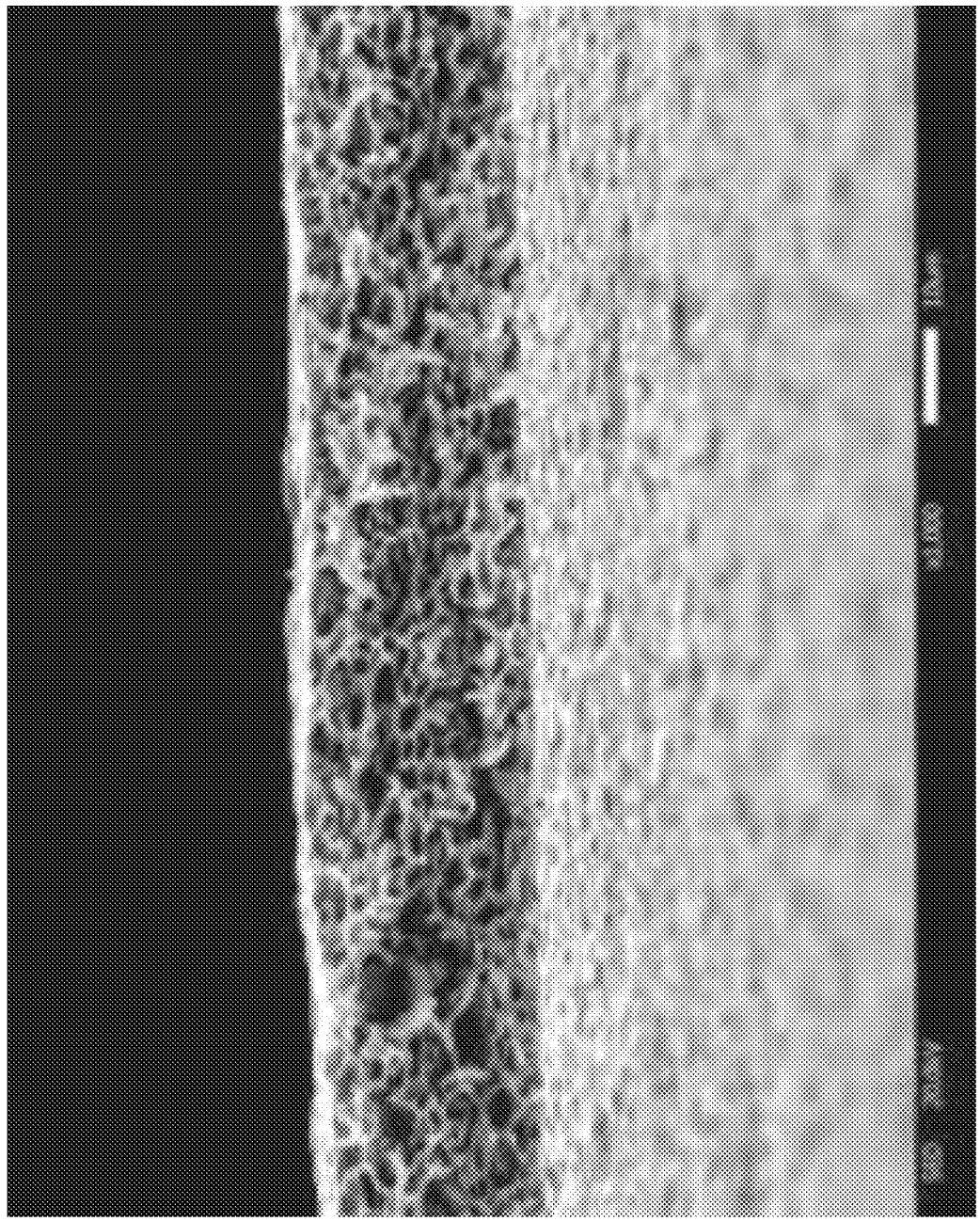
FIG. 2 is a scanning electron micrograph of a cross section of the zeolite/polyimide composite membrane obtained in Example 1 of the disclosure.

FIG. 1 and FIG. 2 are respective scanning electron micrographs of the surface and the cross section of the zeolite/polyimide composite membrane obtained in Example 1. It can be found from FIG. 1 that many small pores with uniformly-distributed pore sizes of 2-4 μm are distributed on the surface of the membrane. It can be found from the cross-sectional topography of FIG. 2 that the interior of the zeolite/polyimide composite membrane is a sponge-like pore structure, and there is no agglomeration of zeolite, so sufficient channels can be provided for transportation of lithium ions.

Figure 3:
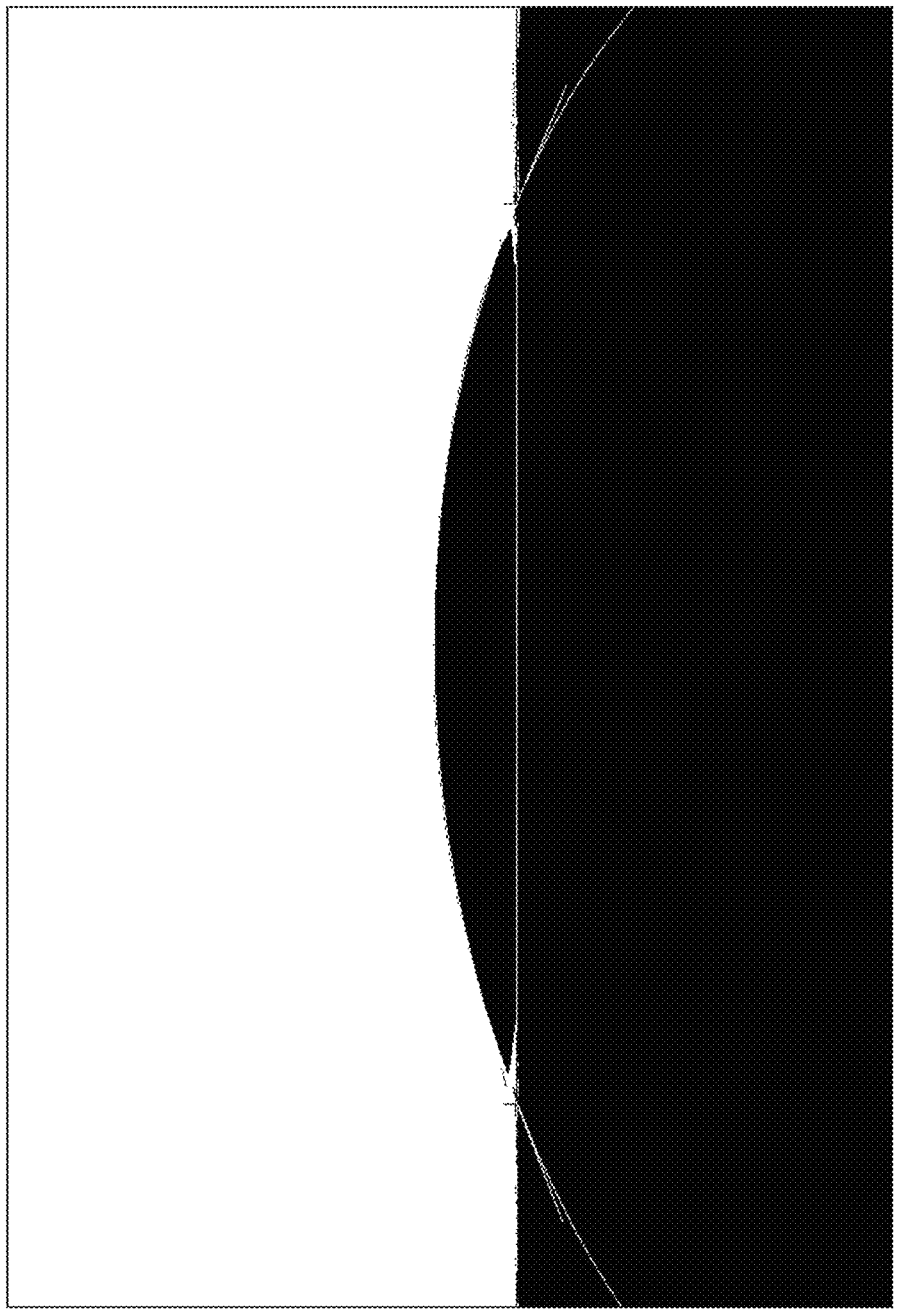
FIG. 3 is a diagram of measuring a contact angle of an electrolyte of the zeolite/polyimide composite membrane obtained in Example 1 of the disclosure.

FIG. 3 is a diagram of measuring a contact angle of an electrolyte of the zeolite/polyimide composite membrane obtained in Example 1. 1 M $LiPF_6$+EC/DMC (1:1) v/v was selected as the electrolyte. The test process was to add one drop of electrolyte on the zeolite/polyimide composite membrane and record its contact angle after 10 s. The contact angle in FIG. 3 was 22°, indicating that the zeolite/polyimide composite membrane prepared in Example 1 had outstanding electrolyte wettability.

The zeolite/polyimide composite membrane obtained in Example 1 had a thickness of 27 μm and a porosity of 53%. A universal testing machine was used to test a mechanical strength of the zeolite/polyimide composite membrane obtained in Example 1. The zeolite/polyimide composite membrane was cut into a rectangular sample of 10 mm×50 mm. The effective test length of the sample was 20 mm. Tensile test was performed for the sample at a tensile rate of 2 mm/min, indicating the tensile strength was 27 MPa. By using lithium iron phosphate as a cathode material and a lithium sheet as an anode material, the zeolite/polyimide composite membrane obtained in Example 1 was impacted into a disc with a diameter of 19 mm, and then assembled into a button cell. The above battery was subjected to a charge-discharge test at a rate of 0.5 C to test its cycle performance. After 50 cycles of charge and discharge, the specific discharge capacity dropped from 146 mAh/g to 139 mAh/g, and the capacity retention rate was 95%.

Example 2

A preparation method of a zeolite/polyimide composite membrane comprises the following steps:
(1) 0.13 g of NaA zeolite and 19 g of N-methylpyrrolidone were weighed and blended at room temperature, and ultrasonicated for 3 h to obtain a zeolite dispersion. 2 mmol of 4,4'-diaminodiphenyl ether and 2 mmol of 2,2-bis(4-(4-aminophenoxy)phenyl)propane were added to the prepared zeolite dispersion at room temperature, and the mixture was mechanically stirred under nitrogen protection to a complete dissolution. Then 4.08 mmol of 3,3',4,4'-diphenyl ether tetracarboxylic dianhydride was added, and the mixture was mechanically stirred under nitrogen protection to react at 5-10° C. for 8 h, thereby obtaining a yellow viscous zeolite-doped polyamic acid precursor casting solution, where a mass ratio of the zeolite to the polyamic acid was 5:100.
(2) After the mixture was defoamed by standing, the above casting solution was blade-coated on a clean glass plate to obtain a liquid membrane with a thickness of 140 μm. Then the liquid membrane was placed in an environment with a room temperature of 25° C. and a humidity of 80%, subjected to preliminary phase separation for 20 min, and then immediately immersed in an ethanol coagulation bath for 10 min such that the liquid membrane was completely phase-separated, thereby obtaining a microporous membrane. Then, the microporous membrane was soaked in de-ionized water for 12 h to remove the residual solvent, thereby obtaining an un-imidized zeolite/polyamic acid porous membrane.
(3) Same as step (3) in Example 1.

The zeolite/polyimide composite membrane obtained in Example 2 had a thickness of 30 μm and a porosity of 59%. A universal testing machine was used to test a mechanical strength of the zeolite/polyimide composite membrane obtained in Example 2. The zeolite/polyimide composite membrane was cut into a rectangular sample of 10 mm×50 mm. The effective test length of the sample was 20 mm. A tensile test was performed for the sample at a tensile rate of 2 mm/min, indicating the tensile strength was 24 MPa. By using lithium iron phosphate as a cathode material and a lithium sheet as an anode material, the zeolite/polyimide composite membrane obtained in Example 2 was impacted into a disc with a diameter of 19 mm, and then assembled into a button cell. The above battery was subjected to a charge-discharge test at a rate of 0.5 C to test its cycle performance. After 50 cycles of charge and discharge, the specific discharge capacity dropped from 148.5 mAh/g to 145 mAh/g, and the capacity retention rate was 98%.

Example 3

A preparation method of a zeolite/polyimide composite membrane comprises the following steps:
(1) 0.26 g of NaA zeolite and 20 g of N'N-dimethylacetamide were weighed and blended at room temperature, and ultrasonicated for 3 h to obtain a zeolite dispersion. 2 mmol of 4,4'-diaminodiphenyl ether and 2 mmol of 2,2-bis(4-(4-aminophenoxy)phenyl)propane were added to the prepared zeolite dispersion at room temperature, and the mixture was mechanically stirred under nitrogen protection to a complete dissolution. Then 4.08 mmol of 3,3',4,4'-benzophenonetetracarboxylic dianhydride was added, and the mixture was mechanically stirred under nitrogen protection to react at 5-10° C. for 10 h, thereby obtaining a yellow viscous zeolite-doped polyamic acid precursor casting solution, where a mass ratio of the zeolite to the polyamic acid was 10:100.
(2) After the mixture was defoamed by standing, the above casting solution was blade-coated on a clean glass plate to obtain a liquid membrane with a thickness of 120 μm. Then the liquid membrane was placed in an environment with a temperature of 20° C. and a humidity of 80%, subjected to preliminary phase separation for 20 min, and then immediately immersed in a de-ionized water coagulation bath for 10 min such that the liquid membrane was completely phase-separated, thereby obtaining a microporous membrane. Then, the microporous membrane was soaked in de-ionized water for 12 h to remove the residual solvent, thereby obtaining an un-imidized zeolite/polyamic acid porous membrane.
(3) The obtained zeolite/polyamic acid porous membrane was dried at 120° C. for 1.5 h to remove the residual solvent and moisture in the membrane, and then was heated at 240° C. for 1 h and at 300° C. for 1 h to realize imidization of the membrane by heating, thereby obtaining the completely-imidized zeolite/polyimide composite membrane.

The zeolite/polyimide composite membrane obtained in Example 3 had a thickness of 31 μm and a porosity of 61%. A universal testing machine was used to test a mechanical strength of the zeolite/polyimide composite membrane obtained in Example 3. The zeolite/polyimide composite membrane was cut into a rectangular sample of 10 mm×50 mm. The effective test length of the sample was 20 mm. A tensile test was performed for the sample at a tensile rate of 2 mm/min, indicating the tensile strength was 20 MPa. By using lithium iron phosphate as a cathode material and a lithium sheet as an anode material, the zeolite/polyimide composite membrane obtained in Example 3 was impacted into a disc with a diameter of 19 mm, and then assembled into a button cell. The above battery was subjected to a charge-discharge test at a rate of 0.5 C to test its cycle performance. After 50 cycles of charge and discharge, the specific discharge capacity dropped from 150 mAh/g to 146 mAh/g, and the capacity retention rate was 97%.

Example 4

A preparation method of a zeolite/polyimide composite membrane comprises the following steps:
(1) 0.38 g of MCM-41 zeolite and 22 g of N-methylpyrrolidone were weighed and blended at room temperature, and ultrasonicated for 3 h to obtain a zeolite dispersion. 2 mmol of 4,4'-diaminodiphenyl ether and 2 mmol of 2,2-bis(4-(4-aminophenoxy)phenyl)propane were added to the prepared zeolite dispersion at room temperature, and the mixture was mechanically stirred under nitrogen protection to a complete dissolution. Then 4.04 mmol of 3,3',4,4'-benzophenonetetracarboxylic dianhydride was added, and the mixture was mechanically stirred under nitrogen protection to react at 0-5° C. for 8 h, thereby obtaining a yellow viscous zeolite-doped polyamic acid precursor casting solution, where a mass ratio of the zeolite to the polyamic acid was 15:100.

(2) After the mixture was defoamed by standing, the above casting solution was blade-coated on a clean glass plate to obtain a liquid membrane with a thickness of 100 μm. Then the liquid membrane was placed in an environment with a temperature of 30° C. and a humidity of 85%, subjected to preliminary phase separation for 20 min, and then immediately immersed in a de-ionized water coagulation bath for 10 min such that the liquid membrane was completely phase-separated, thereby obtaining a microporous membrane. Then, the microporous membrane was soaked in de-ionized water for 12 h to remove the residual solvent, thereby obtaining an un-imidized zeolite/polyamic acid porous membrane.

(3) The obtained zeolite/polyamic acid porous membrane was dried at 140° C. for 1.5 h to remove the residual solvent and moisture in the membrane, and then was heated at 240° C. for 1 h and at 320° C. for 0.5 h to realize imidization of the membrane by heating, thereby obtaining the completely-imidized zeolite/polyimide composite membrane.

The zeolite/polyimide composite membrane obtained in Example 4 had a thickness of 28 μm and a porosity of 56%. A universal testing machine was used to test a mechanical strength of the zeolite/polyimide composite membrane obtained in Example 4. The zeolite/polyimide composite membrane was cut into a rectangular sample of 10 mm×50 mm. The effective test length of the sample was 20 mm. A tensile test was performed for the sample at a tensile rate of 2 mm/min, indicating the tensile strength was 18 MPa. By using lithium iron phosphate as a cathode material and a lithium sheet as an anode material, the zeolite/polyimide composite membrane obtained in Example 4 was impacted into a disc with a diameter of 19 mm, and then assembled into a button cell. The above battery was subjected to a charge-discharge test at a rate of 0.5 C to test its cycle performance. After 50 cycles of charge and discharge, the specific discharge capacity dropped from 147 mAh/g to 141 mAh/g, and the capacity retention rate was 96%.

It will be obvious to those skilled in the art that changes and modifications may be made, and therefore, the aim in the appended claims is to cover all such changes and modifications.

What is claimed is:

1. A method of preparing a composite membrane of zeolite and polyimide, the method comprising:
   1) adding zeolite to an organic solvent, and dispersing the zeolite uniformly to obtain a zeolite dispersion; adding a diamine monomer and a dianhydride monomer to the zeolite dispersion, and carrying out condensation polymerization reaction between the diamine monomer and the dianhydride monomer in the presence of the zeolite to obtain a casting solution of polyamic acid, the casting solution being doped with zeolite; wherein the zeolite is present in an amount of between 1 wt. % and 5 wt. % of the zeolite dispersion; and the zeolite is at least one of MCM-41, NaY, NaA and ZSM-5;
   2) coating a surface of a substrate with the casting solution obtained in 1) to form a liquid membrane; placing the liquid membrane in an environment with a humidity of between 70% and 90% for preliminary phase separation, and placing the liquid membrane in a coagulation bath for complete phase separation, thereby obtaining a composite porous membrane of zeolite and polyamic acid; and
   3) Performing thermal imidization on the composite porous membrane of zeolite and polyamic acid obtained in 2) through gradient heating to obtain the composite membrane of zeolite and polyimide.

2. The method of claim 1, wherein in 1), the diamine monomer and the dianhydride monomer are added to the zeolite dispersion at 0-15° C. for performing condensation polymerization reaction; and a molar ratio of the diamine monomer to the dianhydride monomer is 1:1.01-1.02.

3. The method of claim 1, wherein in 1), the diamine monomer is at least one of 4,4'-diaminodiphenyl ether, 2,2-bis(4-(4-aminophenoxy)phenyl)propane, 4,4'-diaminodiphenyl sulfone, 4,4'-diaminodiphenylmethane and m-phenylenediamine; and the dianhydride monomer is at least one of pyromellitic dianhydride, 3,3',4,4'-diphenyl ether tetracarboxylic dianhydride, 3,3',4,4'-benzophenonetetracarboxylic dianhydride, 3,3',4,4'-biphenyl tetracarboxylic dianhydride and 4,4'-(hexafluoroisopropylidene)phthalic anhydride.

4. The method of claim 1, wherein in 1), the organic solvent is at least one of N'N-dimethylformamide, N'N-dimethylacetamide, N-methylpyrrolidone and dimethylsulfoxide.

5. The method of claim 1, wherein in 1), in the casting solution, a mass ratio of the zeolite to the polyamic acid is 5:100-15:100, and a total mass percentage of the zeolite and the polyamic acid is 10%-20%.

6. The method of claim 1, wherein in 2), an operating temperature is 20° C.-30° C., and the coagulation bath is water or/and ethanol.

7. The method of claim 1, wherein in 3), the composite porous membrane of zeolite and polyamic acid is held at 100-140° C. to remove a residual solvent and moisture; then the composite porous membrane is held at 200-240° C. for 0.5-1 h, and held at 280-320° C. for 0.5-1 h to realize imidization of the composite porous membrane, thereby obtaining the composite membrane of zeolite and polyimide.

8. A lithium ion battery comprising the composite membrane prepared by the method of claim 1 as a separator.

* * * * *